United States Patent [19]

Buscall et al.

[11] Patent Number: 5,064,718
[45] Date of Patent: Nov. 12, 1991

[54] INORGANIC PARTICLES

[75] Inventors: Richard Buscall, Cheshire; Paul J. Scales, South Wirrall; Serena J. Williams, Cheshire; Jill E. Newton, W. Midlands, all of England

[73] Assignee: Imperial Chemical Industries, PLC, London, England

[21] Appl. No.: 515,747

[22] Filed: Apr. 27, 1990

[30] Foreign Application Priority Data

Apr. 27, 1989 [GB] United Kingdom ................. 8909730

[51] Int. Cl.$^5$ ......................... B32B 15/08; B05D 7/00; C08K 9/00; C08L 43/00
[52] U.S. Cl. .................................... 428/407; 427/221; 523/200; 524/547
[58] Field of Search ........................ 524/547; 523/200; 428/407; 427/221

[56] References Cited

U.S. PATENT DOCUMENTS 4,417,992 11/1983 Bhattacharyya et al. ............. 252/88
4,698,379 10/1987 Nakaya et al. ...................... 523/513
4,867,613 9/1989 McLeod et al. .................... 405/263
4,892,902 1/1990 Shioji et al. .......................... 524/417

FOREIGN PATENT DOCUMENTS 50-15751 6/1975 Japan .
62-064894 3/1987 Japan .
63-152980 6/1988 Japan .

OTHER PUBLICATIONS

CA 84:165593t, 1976.

Primary Examiner—Joseph L. Schofer
Assistant Examiner—Wu c. Cheng
Attorney, Agent, or Firm—Cushman, Darby & Cushman

[57] ABSTRACT

A method for the preparation of colloidally stable particles of inorganic solid at high concentration which method comprises at least the step of precipitating from an aqueous medium the particles of the inorganic solid in the presence of a copolymer which comprises repeating units derived from:

Component A: a hydrophilic oligomer or polymer bearing an addition-polymerizable olefinically-unsaturated group;

Component B: an olefinically-unsaturated compound capable of copolymerizing with Component A and bearing a mineral acid group or a dicarboxylic acid group, or a carboxylic acid and a further group capable of hydrogen-bonding.

17 Claims, No Drawings

INORGANIC PARTICLES

The present invention relates to the preparation of inorganic particles by precipitation or growth from solution.

The preparation of solid inorganic particles of a specific size and shape has long been a desired objective and control thereof tends to be restricted to certain specific inorganic solids. Whereas such control has previously been effected at high dilution, such high dilution often has the disadvantage that isolation of the particles therefrom tends to be prolonqed, tedious and expensive. Often such methods cannot be scaled up to operate on a commercial scale with the production of fine particles. For example (a) the procedure described in EP 0,214,000 gives magnesium hydroxide particles many times larger and at far greater dilution than the process hereinafter described; (b) attempts to reproduce zinc sulphide preparations of the type described by D. M. Wilhelmy et al (J. Chem. Soc., Faraday transactions 1984, 80, 563) at significantly higher concentrations gave aggregates not discrete crystals.

We have now devised a method for preparing colloidally stable particles of a wide range of inorganic solids, at high concentration, of controlled size, size distribution and shape.

According to the present invention there is provided a method for the preparation of a particulate inorganic solid which method comprises at least the step of precipitating from an aqueous medium the particles of the inorganic solid in the presence of a copolymer which comprises repeating units which are derived from:
Component A: a hydrophilic oligomer or polymer bearing an addition-polymerisable olefinically-unsaturated group;
Component B: an olefinically-unsaturated compound capable of copolymerising with Component A and bearing
 i) a monobasic acid group or
 ii) a dibasic carboxylic acid group or
 iii) a moiety bearing both a carboxylic acid group and a further group capable of involvement in hydrogen-bonding therewith.

Optionally the copolymer is derived from a further component, in addition to Components A and B, i.e. Component C: a further olefinically unsaturated compound capable of copolymerising with Components A and B; and wherein, where component C is present, 5-75 mole % of the copolymer is provided by the residue of Component A, 25-95 mole % thereof is provided by the residue of Component B and up to 20 mole % thereof is provided by the residue of Component C. Where Component C is present in the copolymer, the mole % thereof in the copolymer will be chosen such that it does not unduly reduce the miscibility of the copolymer in the aqueous medium.

Typically, the molecular weight of the copolymer is between 2,000 and 50,000.

As examples of the hydrophilic chain of Component A may be mentioned inter alia poly(vinyl-pyrrolidone), the preparation of which is more fully described in our UK 1,096,912, polyoxazolenes, or preferably a water soluble poly(alkylene glycol), more preferably polyethylene glycol (hereinafter referred to for convenience as PEG).

We do not exclude the possibility that where the hydrophobic chain of Component A comprises PEG, the PEG may include a small amount of a further polyalkylene glycol, e.g. propylene glycol, in the chain providing that it does not effect the solubility of the chain. For example where PEG of molecular weight about 1,000 is used it may include a few propylene glycol residues.

As examples of the addition-polymerisable group in Component A may be mentioned inter alia an allyl ether, an alkenyl benzyl ether, a vinyl ether, e.g. vinyl ether of PEG, or preferably an (alk) acrylate, e.g. a methacrylate, or more preferably an acrylate. Preferably the addition-polymerisable group is a terminal group on the oligomer or polymer backbone. However we do not exclude the possibility that the addition-polymerisable group may be intermediate the ends thereof, e.g. the di-PEG ester of maleic acid.

As examples of the terminal group of Component A distant the addition-polymerisable group thereof, particularly where Component A is derived from PEG, may be mentioned inter alia hydroxy, ester or preferably lower alkoxy bearing up to 4 cabon atoms or more preferably methoxy.

Typically, the molecular weight of Component A is between 500 and 5,000.

In Component B, the mineral acid group, where present, is preferably derived from phosphorus, although we do not exclude the possibility that it may be derived from sulphur. As examples of such mineral acid groups may be mentioned inter alia phosphinic

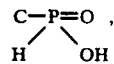

or preferably a dibasic acid, e.g. pyrophosphonic

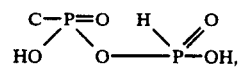

or preferably phosphonic acid

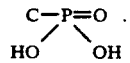

The aforementioned further group, where present, in Component B is preferably a hydroxyl group. However, we do not exclude the possibility that it may be, for example, an amide or amine.

Where Component B bears a carboxyl group it is preferred that the second carboxyl group or the further group is bonded to the same or adjacent carbon atoms, e.g. allyl malonic acid and acrylamidoglycollic acid.

As preferred examples of Component B may be mentioned inter alia maleic acid, citraconic acid, itaconic acid, 2-acrylamidoglycollic acid, allylmalonic acid, 1,2,3-butenetricarboxylic acid and vinyl phosphonic acid.

In the copolymer of the present invention, the acidic groups of Component B may be at least partially neutralised by a base such that a water-soluble or water-dispersible derivative thereof is produced.

The ratio of the pendant oligomeric/polymeric chains to acid groups in the copolymer is preferably between 1:1 and 1:19. It will be appreciated that where Component B is a dicarboxylic acid the molar ratio thereof in the copolymer is often about half what it would be if a monocarboxylic acid were used to give the same chain:acid ratio.

For PEG we would mention the following molar ratios of Component A:Component B

| Component A | Component B | Ratio |
|---|---|---|
| PEG; acrylate | Vinyl-phosphonic | 1:19 |
| " | Maleic | 1:1 |
| " | Hydroxy-acid? | 1:9 |

Where the aforementioned further group is present in Component B the ratio of carboxylic acid:further group is preferably 1:1. However, we do not exclude the possibility that Component B may be a mixture of acids, e.g. a dicarboxylic acid and a hydroxy-carboxylic acid.

As examples of Component C may be mentioned inter alia hydrophobic monomers, e.g. alkyl methacrylates; functionalised compounds, e.g. 4-vinylpyridine and dimethyl-aminoethyl methacrylate, etc; or preferably low MW monomers, e.g. methyl methacrylate.

We have found that (a) where Component C is hydrophobic, the molar % thereof in the copolymer is typically less than 10 such that the miscibility of the copolymer is not adversely affected; or (b) where Component C provides a minor amount of an acidic monomer, e.g. a sulphonated monomer, it could improve the solubility of the copolymer at low pH.

As preferred copolymers for use as dispersing agents in the method according to the present invention may be mentioned inter alia i) 1:1 mole ratio of methoxy-PEG-acrylate and maleic acid (e.g. obtained by hydrolysis of the anhydride), optionally at least partially neutralised by base;

ii) methoxy-PEG-acrylate and 2-acrylamido-glycolic acid wherein the molar concentration of 2-acrylamidoglycollic acid is between 50 and 90%.

iii) methoxy-PEG-methacrylate and vinyl phosphonic acid wherein the molar concentration of vinyl phosphonic acid is between 50 and 90%; and iv) methoxy-PEG-acrylate, vinyl phosphonic acid and methyl methacrylate wherein the molar concentrations are, methyl methacrylate: less than 20%; vinyl phosphonic acid: 50–90%; and methoxy-PEG-acrylate: less than 50%.

The copolymers used in the present invention may typically be prepared by methods known to the skilled man. For example, our European Patent Specification No 0,182,523, the disclosure in which is incorporated herein by way of reference, discloses a plurality of methods for the preparation of such copolymers.

Preferably water is the major component of the aqueous medium used in the present invention. However, we do not exclude the possibility that the medium may comprise certain polar organic solvents in which the hydrophilic residue, e.g. PEG, is soluble.

Preferably the solid which is precipitated is a sparingly water-soluble salt, or a hydroxide, or one or more oxides, e.g. ferrites. We do not exclude the possibility that in the salt, where a salt is precipitated, the anion may be derived from an organic acid or the cation from an organic base.

The particles produced in the method according to the present invention may be produced by homogeneous degradation of an appropriate precursor or preferably by double decomposition of soluble salt solutions. It will be appreciated that the rate of precipitation of the particles may be controlled by the rate of degradation of the homogeneous precursor or the rate of addition of the soluble salts solutions as appropriate.

It will be appreciated that addition of certain conventional additives, e.g. sodium citrate, may often be used to influence the crystal habit of the aforementioned particles.

We have found surprisingly that in certain cases the size and shape of the precipitated particles prepared in the method according to the present invention may be controlled by adjusting (i) the concentration of the added copolymer and/or (ii) the pH of the medium from which the solid is precipitated. Furthermore, we have found surprisingly that in certain cases neutralisation of the copolymer with, for example, an alkali of a monovalent cation, e.g. sodium hydroxide, produces different morphologies from those produced by neutralisation with a soluble multivalent cation, e.g. calcium and magnesium.

Furthermore, we have found that there is a tendency for the addition of further additives, for example multipolar organic compounds, e.g. tris-(hydroxymethyl)-amino-methane, to control particle size and morphology without causing particle flocculation.

Typically, the particulate inorganic solid prepared by the method according to the present invention will have a particle size between 5nm and 10$\mu$. For example we have obtained zinc sulphide particles of between 40 and 60 nm. Surprisingly the concentration thereof, e.g. about 2.5% by weight, is higher than that obtained by conventional methods.

The particles so precipitated may be used as inter alia a seed for further precipitation of the same, or different, inorganic compound.

Inorganic particles according to the second aspect of the present invention may be used in inter alia the pigment, filler, catalyst or ceramic industries.

Typically, the particles prepared by the process according to the present invention have a certain proportion of the polymer hereinbefore defined absorbed on the surface thereof.

According to a second aspect of the present invention there is provided a particulate inorganic solid the particles of which have absorbed on the surfaces thereof a polymer as hereinbefore defined.

Typically the average weight of the polymer absorbed on the particles of the inorganic solid is between 0.01% w/w and 30% w/w. However, this percentage range is not critical. The skilled man will be able to determine by simple experiment a concentration of polymer on a certain particulate solid appropriate to the use to which he will put the particles.

The present invention is further illustrated by reference to the following Examples.

EXAMPLES 1-9

These Examples illustrate the preparation of coplymers useful in the present invention.

GENERAL PROCEDURE

The polymerisations were carried out in a glass flanged flask fitted with a stirrer, reflux condenser and with provision for the introduction of an inert gas, e.g. nitrogen. The flask was charged with a first portion (as indicated in Table 1) of the solvent and heated in an oil bath to 85° C. The monomers and inhibitor were dissolved in a second portion of the solvent and fed into the heated flask over a one hour period, using a dropping funnel. The total reaction mixture was stirred at 85° C. for 23 hours, i.e. total reaction time was 24 hours. The reaction mixture was cooled and the polymer was isolated by slowly pouring the reaction mixture into a five-fold excess of diethylether. The resultant polymer was filtered and dried in a vacuum oven at 30° C. for at least 8 hours. The specific monomers and conditions used in these Examples are shown in Table 1.

EXAMPLES 10-13

These Examples illustrate the preparation of further copolymers useful in the present invention.

The general procedure of Examples 1-9 was repeated except that (a) the reaction was carried out in industrial methylated spirit (IMS), (b) the reaction mixture was adjusted to pH 8.0 using 1M NaOH solution, before charging it to the reaction vessel, (c) the initiator was 4,4-azo-bis-4-cyanovaleric acid instead of $\alpha$-azo-isobutyronitrile and (d) the reaction was carried out at 75° C. instead of 85° C. The product was isolated by removing about 50-60% of the IMS by vacuum distillation In Examples 13-15, solutions of sodium sulphate (0.5M; 200 cm$^3$) and barium chloride (0.5M; 200 cm$^3$) were simultaneously added at 0.56 mls/min to a stirred aqueous solution of a methoxy-PEG-acrylate/maleic acid copolymer (2.8 g; 200 cm$^3$). The polymer solution was neutralised to pH 7 with sodium hydroxide. The experiment was repeated at different pH, with different alkali metal sulphates, different stirring rates and different additives, e.g. citrate.

The results are given in Table 3. From Table 3 it can be seen that conventional dispersants for inorganic particles, i.e. "Calgon" (a sodium polyphosphate) and lignosulphonate, gave aggregated particles at the solids content described herein.

EXAMPLES 18-23

These Examples illustrate the preparation of certain further inorganic particles, e.g. salts and hydroxides.

GENERAL PROCEDURE

Double decomposition was carried out by adding, at

TABLE 1

| | | Reaction Mixture | | | | |
|---|---|---|---|---|---|---|
| EXAMPLE NO. | Solvent First Portion (Grams) | Component A Hydrophilic Component (Grams) | Component B Acidic Component (Grams) | Component C Termonomer (Grams) | Initiator $\alpha$-azo-isobutyro-nitrile: (Grams) | Solvent second portion (Grams) |
| 1 | T (30) | A1 (95) | M (5) | — | 2 | 120 |
| 2 | D (30) | A2 (10.9) | V (20) | — | 0.61 | 73 |
| 3 | D (15) | A1 (26) | V (8.64) | MMA (1) | 0.71 | 68.2 |
| 4 | T (10) | A1 (16) | I (1.4) | — | 0.35 | 30 |
| 5 | T (12) | A1 (26.3) | C (1.5) | — | 0.35 | 30 |
| 6 | D (5.6) | A1 (10.4) | V (8.21) | — | 0.37 | 13 |
| 7 | T (15) | A1 (30) | M (1.5) | S (0.2) | 0.63 | 30 |
| 8 | T (8.0) | A1 (18.5) | M (1.0) | VP (1.0) | 0.41 | 40 |
| 9 | D (15) | A1 (26) | V (2.2) | — | 0.57 | 51.0 |

T: Toluene;
D: Dimethyl formamide;
A1: Methoxy-PEG-acrylate (MW2600);
A2: Decaethylene glycol monomethacrylate;
M: Maleic anhydride;
V: Vinyl phosphonic acid;
I: Itaconic anhydride;
MMA: Methyl methacrylate;
AAG: Acrylamidoglycollic acid.
C: Citraconic acid
S: Styrene
VP: Vinyl Pyridine and pouring the residue into a five-fold excess of diethyl ether. The polymer, which precipitated, was filtered and dried in a vacuum over at 30° C. for at least 8 hours. The specific monomers and conditions used in these Examples are shown in Table 2.

EXAMPLES 14-17

These Examples illustrate the preparation of barium sulphate particles of controlled size, at a solids content of about 4 wt %.

a rate indicated hereinafter, the appropriate components simultaneously to a stirred aqueous solution of a methoxy-PEG-acrylate/maleic acid copolymer (prepared in Example 1) or in Example 23 methoxy-PEG-acrylate/vinyl phosphonic acid copolymer (prepared in Example 9). In Examples 19 and 20, the pH

TABLE 2

| | | Reaction Mixture | | | | |
|---|---|---|---|---|---|---|
| EXAMPLE NO. | First Portion IMS (Grams) | Component A Hydrophilic Component (Grams) | Component B Acidic Component (Grams) | Component C Termonomer (Grams) | Initiator: (Grams) | Second Portion IMS (Grams) |
| 10 | 20 | A1 | AAG | — | 0.51 | 82.4 |

TABLE 2-continued

| | | Reaction Mixture | | | | |
|---|---|---|---|---|---|---|
| EXAMPLE NO. | First Portion IMS (Grams) | Component A Hydrophilic Component (Grams) | Component B Acidic Component (Grams) | Component C Termonomer (Grams) | Initiator: (Grams) | Second Portion IMS (Grams) |
| 11 | 24 | A1 (20) | AAG (5.6) (10) | MMA (1.0) | 0.62 | 100 |
| 12 | 10 | A1 (10) | AM (3.0) | — | 0.26 | 29 |
| 13 | 15 | A1 (13) | B (8.5) | — | 0.43 | 49.5 |

A1, AAG and MMA have the meanings ascribed to them in Table 1;
AM: Allylmalonic acid
B: Butene-1,2,3-tricarboxylic acid

TABLE 3

| Example No | Alkali Metal Sulphate | Polymer Type | Polymer Concentration (wt %) | pH | Additives | Product |
|---|---|---|---|---|---|---|
| 14 | Na | M | 1.4 | 7.0 | NaOH | 1.5–4.0 μm; discrete particles square/diamond shaped tablets |
| 15 | K | M | 1.4 | 10.0 | NaOH | 0.5–3.0 μm; discrete particles square/diamond shaped tablets |
| 16 | Na | M | 1.4 | 3.0 | Sodium citrate (0.8 wt %) | 0.5–1.0 μm; discrete particles multi-facetted spheres |
| 17 | K | P | 1.4 | 3.0 | — | 0.5–1.5 μm discrete particles square/diamond shaped tablets |
| CT | K | — | — | 5–6 | — | 10–40 μm aggregated particles |
| CT | K | C | 0.01 | 5–6 | — | aggregated particles |
| CT | K | L | 1.4 | ≈5 | — | aggregated particles |

CT: Comparative Test;
M: Methoxy-PEG-acrylate/maleic acid (prepared in Example 1);
P: Methoxy-PEG-acrylate/vinyl phosphonic acid/(prepared in Example 9);
C: Sodium polyphosphate; Calgon (ex BDH);
L: Lignosulphonate (Reax 15B, ex Westvaco)

of the polymer solution was adjusted to 11 and 8 respectively with sodium hydroxide, before addition of the salt solutions. Discrete particles were obtained. Details of the procedures are given in Table 4.

EXAMPLE 24

This Example illustrates the use of an aqueous medium comprising 10% w/w methanol in the method according to the present invention.

The General Procedure of Examples 14–17 was repeated except that the solvents for the barium chloride, potassium sulphate and copolymer prepared in Example 1 were mixtures of water (180 g) and methanol (20 g). An additive, tris-hydroxymethyl- amino-methane was present in the copolymer solution. Barium sulphate was obtained as discrete particles of size 0.4–0.6 μm.

EXAMPLES 25-26

These Examples illustrate the preparation of barium carbonate particles by the method of the present invention.

The procedure of Examples 14–17 was repeated except that 0.8M sodium carbonate was used instead of 0.5M sodium sulphate, the molarity of the barium chloride solution was 0.8M instead of 0.5M and 3.16 g of polymer were used instead of 2.8 g, i.e. the polymer concentration was 1.58% w/w.

The results are shown in Table 5.

TABLE 4

| Example No | Starting Materials | | Rate of Addition cm³/min | Polymer Concentration | Product (particle size) |
|---|---|---|---|---|---|
| 18 | Zn(NO₃)2 1.34 M; 25 cm³ | Na₂S 1.34 M; 25 cm³ | 0.2 | 1.4 g; 50 cm³ | ZnS 0.04–0.06 μm |
| 19 | MgCl₂ 0.75 M; 50 cm³ | NaOH 0.75 M; 50 cm³ | 0.14 | 0.3 g; 50 cm³ | Mg(OH)₂ 0.06–0.15 μm |
| 20 | CaCl₂ 1.0 M; 50 cm³ | K F 1.0 M; 50 cm³ | 0.14 | 0.3 g; 50 cm³ | CaF₂ 0.06–0.15 μm |
| 21 | CaCl₂ 0.7 M; 50 cm³ | Na₂CO₃ 1.89 M; 50 cm³ | 0.16 | 0.7 g; 50 cm³ | CaCO₃ 0.5–4 μm |
| 22 | CdCl₂ 0.5 M; 50 cm³ | Na₂CO₃ 1.155; 50 cm³ | 0.17 | 0.7 g; 50 cm³ | CdCO₃ 0.3–1.5 μm |
| 23 | MgCl₂ 0.75 M; 50 cm³ | NaOH 1.50 M; 50 cm³ | 0.14 | 0.45 g; 50 cm³ | Mg(OH)₂ 0.12 μm |
| CT | MgCl₂ 0.75 M; 50 cm³ | NaOH 0.75 M; 50 cm³ | 0.14 | 0.0 g; 50 cm³ | Mg(OH)₂ aggregated |

TABLE 4-continued

| Example No | Starting Materials | Rate of Addition cm³/min | Polymer Concentration | Product (particle size) |
|---|---|---|---|---|
| | | | | particles |

TABLE 5

| Ex. No. | pH | Additives | Product |
|---|---|---|---|
| 25 | 3.5 | — | Discrete particles, 0.5–1.2 μm |
| 26 | 7.0 | NaOH | Discrete particles, 0.5–1.5 μm |
| CT | 7.0 | NaOH | Aggregated particles |

EXAMPLE 27

This Example illustrates the preparation of zinc oxide particles by the method of the present invention.

Solutions of 0.4M sodium hydroxide (200 cm³) and 0.2M zinc nitrate (200 cm³) were simultaneously added at 1.67 mls/minute to a stirred aqueous solution of the polymer prepared in Example 1 (2.4 g;200 cm³). The pH was kept constant at pH 10 using a pH controller. Discrete particles (0.2–0.4 μm) were obtained.

In Comparative Tests; the above procedure was repeated except that in a first Comparative Test the polymer was omitted and in a second Comparative Test the polymer was replaced by a commercially available dispersing agent, i.e "Dispex" A40, polyacrylic acid. In the first and second Comparative Tests, aggregated particles and a gel formed respectively.

We claim:

1. A method for the preparation of a particulate inorganic solid which method comprises at least the step of precipitating from an aqueous medium the particles of the inorganic solid in the presence of a copolymer which comprises repeating units which are derived from:
   Component A: a hydrophilic oligomer or polymer bearing an addition-polymerisable olefinically-unsaturated group;
   Component B: an olefinically-unsaturated compound capable of copolymerising with Component A and bearing
   i) a monobasic acid group or
   ii) a dibasic acid group or
   iii) a moiety bearing both a carboxylic acid group and a further group capable of involvement in hydrogen bonding therewith.

2. A method as claimed in claim 1 wherein in Component B, where the carboxylic acid group and the said further group are present, or where Component B is a dicarboxylic acid, both functional groups are borne on the same or adjacent carbon atoms.

3. A method as claimed in claim 1 wherein the copolymer further comprises the residue of a further olefinically-unsaturated compound capable of copolymerising with Components A and B; and wherein 5–75 mole % of the copolymer is provided by the residue of Component A, 25–95 mol % thereof is provided by the residue of Component B and up to 20 mole % thereof is provided by the residue of Component C.

4. A method as claimed in claim 1 wherein in the copolymer the hydrophilic oligomer or polymer is derived from a water-soluble poly(alkylene glycol).

5. A method as claimed in claim 1 wherein in the copolymer the addition-polymerisable group in Component A is a terminal group on the oligomer or polymer chain.

6. A method as claimed in claim 4 wherein in the copolymer the addition-polymerisable olefinically unsaturated group in Component A is an (alk)acrylate.

7. A method as claimed in claim 5 wherein in the copolymer the terminal group distant from the addition polymerisable group of Component A is a lower alkoxy group group bearing up to 4 carbon atoms.

8. A method as claimed in claim 1 wherein in the copolymer Component B contains a dibasic mineral acid group.

9. A method as claimed in claim 1 wherein in the copolymer Component B comprises a dicarboxylic acid group.

10. A method as claimed in claim 3 wherein in the copolymer Component C comprises a low MW monomer.

11. A method as claimed in claim 8 wherein the copolymer is a methoxy-PEG-methacrylate and vinyl phosphonic acid copolymer wherein the molar concentration of vinyl phosphonic acid is between 50 and 90%; or a methoxy-PEG-acrylate, vinyl phosphonic acid, methyl methacrylate copolymer wherein the molar concentrations are, methyl methacrylate: less than 20%; vinyl phosphonic acid: 50–90%; and methoxy-PEG-acrylate: less than 50%.

12. A method as claimed in claim 1 wherein the inorganic solid is a sparingly water-soluble salt, hydroxide or oxide.

13. A method as claimed in claim 1 wherein the particles are produced in situ by double decomposition.

14. A method as claimed in claim 1 wherein a multipolar organic compound is present in the precipitating medium.

15. A particulate inorganic solid wherein a copolymer is absorbed on the particles and wherein the copolymer comprises repeating units which are derived from:
   Component A: a hydrophilic oligomer or polymer bearing an addition-polymerisable olefinically-unsaturated group; and
   Component B: an olefinically unsaturated compound capable of copolymerising with Component A and bearing
   (i) a monobasic acid group or
   (ii) a dibasic acid group or
   (iii) a moiety bearing both a carboxylic acid group and a further group capable of involvement in hydrogen-bonding therewith.

16. A particulate inorganic solid as claimed in claim 15 wherein the inorganic solid is a sparingly-soluble salt, hydroxide or oxide.

17. A particulate inorganic solid as claimed in claim 15 wherein, on average, the concentration of the copolymer is between 0.1 and 30% w/w of the particles.

* * * * *